US012626867B2

(12) United States Patent
Mizuno

(10) Patent No.: US 12,626,867 B2
(45) Date of Patent: May 12, 2026

(54) MULTILAYER CERAMIC ELECTRONIC COMPONENT

(71) Applicant: Murata Manufacturing Co., Ltd., Nagaokakyo (JP)

(72) Inventor: Hiroki Mizuno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 101 days.

(21) Appl. No.: 18/617,691

(22) Filed: Mar. 27, 2024

(65) Prior Publication Data

US 2025/0279241 A1 Sep. 4, 2025

(30) Foreign Application Priority Data

Mar. 4, 2024 (JP) ................................. 2024-031821

(51) Int. Cl.
| | |
|---|---|
| *H01G 4/30* | (2006.01) |
| *H01G 4/008* | (2006.01) |
| *H01G 4/12* | (2006.01) |
| *H01G 4/232* | (2006.01) |

(52) U.S. Cl.
CPC ............. *H01G 4/30* (2013.01); *H01G 4/0085* (2013.01); *H01G 4/1227* (2013.01); *H01G 4/1236* (2013.01); *H01G 4/2325* (2013.01)

(58) Field of Classification Search
CPC ...... H01G 4/30; H01G 4/0085; H01G 4/1227; H01G 4/1236; H01G 4/2325; H01G 4/012; H01G 4/232; H01G 4/005
See application file for complete search history.

(56) References Cited

U.S. PATENT DOCUMENTS

| | | | |
|---|---|---|---|
| 2011/0157765 A1* | 6/2011 | Kim ......................... | H01G 4/01 |
| | | | 29/25.03 |
| 2013/0094118 A1 | 4/2013 | Kim et al. | |
| 2014/0311783 A1* | 10/2014 | Lee ........................ | H01G 4/005 |
| | | | 361/321.2 |
| 2014/0326494 A1* | 11/2014 | Chung ..................... | H01G 4/30 |
| | | | 361/301.4 |

(Continued)

FOREIGN PATENT DOCUMENTS

| | | | |
|---|---|---|---|
| JP | 2000-357628 A | | 12/2000 |
| JP | 2004022859 A | * | 1/2004 |

(Continued)

*Primary Examiner* — Timothy J. Dole
*Assistant Examiner* — Esther N Lian
(74) *Attorney, Agent, or Firm* — Keating & Bennett, LLP

(57) ABSTRACT

A multilayer ceramic capacitor includes two outer layer portions on sides of an inner layer portion, first and second side gap portions respectively adjacent to first and second lateral surfaces, and external electrodes respectively on first and second end surfaces. A dimension of the inner layer portion in a width direction is equal or substantially equal between first and second main surfaces in a lamination direction. In a cross section of lamination and width directions in a middle portion in a length direction, a dimension of the first side gap portion in the width direction is equal or substantially equal between sides on the first and second main surfaces in the lamination direction, and a dimension of the second side gap portion in the width direction gradually increases from the middle portion in the lamination direction toward the side of the second main surface.

20 Claims, 8 Drawing Sheets

(56)                     References Cited

U.S. PATENT DOCUMENTS

2015/0075854  A1 *   3/2015   You ......................... H01G 4/35
                                                      361/275.1
2018/0374643  A1 *  12/2018   Inomata ............... H01G 4/2325
2021/0159018  A1     5/2021   Kato
2022/0270826  A1 *   8/2022   Tanaka ................. H01G 4/1227

FOREIGN PATENT DOCUMENTS

JP          2021086893  A        6/2021
KR           101197921  B1      11/2012
KR         20140129611  A   *  11/2014   ............. H01G 4/232
KR           101548904  B1       9/2015

* cited by examiner

MULTILAYER CERAMIC ELECTRONIC COMPONENT

CROSS REFERENCE TO RELATED APPLICATIONS

This application claims the benefit of priority to Japanese Patent Application No. 2024-031821 filed on Mar. 4, 2024. The entire contents of this application are hereby incorporated herein by reference.

BACKGROUND OF THE INVENTION

1. Field of the Invention

The present invention relates to multilayer ceramic electronic components.

2. Description of the Related Art

In the related art, a multilayer ceramic capacitor is known as a multilayer ceramic electronic component. The multilayer ceramic capacitor includes a multilayer body including an inner layer portion including a plurality of internal dielectric layers and internal electrode layers that are alternately laminated, and side gap portions on both sides in the width direction of the inner layer portion, and external electrodes on both end surfaces of the multilayer body.

Such a multilayer ceramic capacitor is manufactured, for example, by cutting a mother block formed by laminating a plurality of ceramic green sheets defining internal dielectric layers on each of which an electrically conductive paste defining an internal electrode layer is printed, into a predetermined size to manufacture a multilayer body, and providing external electrodes on the multilayer body (for example, refer to Japanese Unexamined Patent Application Publication No. 2000-357628).

When the mother block is cut into a predetermined size, the mother block is cut in the length direction and the width direction. Here, the portion between the electrically conductive plates, in the width direction, defining a side gap portion on which the electrically conductive paste is not printed is cut from one side toward the other side in the lamination direction. At this time, the cutting blade is initially positioned substantially in the middle between the electrically conductive pastes, but there is a possibility that the cutting blade is displaced from the middle as it moves from one side in the lamination direction toward the other side (from the upper side to the lower side) and approaches the electrically conductive paste.

Here, the adhesion strength between the electrically conductive paste and the ceramic green sheet is weaker than that of the portion where the ceramic green sheets defining the side gap portion are directly laminated. Therefore, when the cutting blade approaches the portion on which the electrically conductive paste is printed, a downward force is applied to the electrically conductive paste, and there is a possibility that the ceramic green sheet on which the electrically conductive paste is printed is separated from the ceramic green sheet laminated thereon, such that interlayer peeling occurs.

In order to avoid such interlayer peeling, it is conceivable to gradually increase the width of the side gap portion from the upper side to the lower side in both directions in the width direction, thereby tolerating the displacement of the cutting blade in either direction in the width direction.

However, in recent years, there is a demand for a reduction in size and a large capacitance of a multilayer ceramic capacitor. When the width of the side gap portion gradually increases from the upper side to the lower side in both directions in the width direction, the dimension of the electrically conductive paste in the width direction in the lower side, that is, the dimension of the internal electrode layer in the width direction, becomes small, resulting in a contradiction to the reduction in size and the large capacitance.

SUMMARY OF THE INVENTION

Example embodiments of the present invention provide multilayer ceramic electronic components that are each able to satisfy a demand for a reduction in size and an increased capacitance and to reduce the possibility of an occurrence of interlayer peeling.

An example embodiment of the present invention provides a multilayer ceramic electronic component that includes a multilayer body including an inner layer portion including a plurality of internal electrode layers and a plurality of internal dielectric layers that are laminated, a first main surface and a second main surface opposed to each other in a lamination direction, a first end surface and a second end surface opposed to each other in a length direction intersecting the lamination direction, a first lateral surface and a second lateral surface opposed to each other in a width direction intersecting the lamination direction and the length direction, two outer layer portions respectively on one of two sides of the inner layer portion in the lamination direction, and a first side gap portion adjacent to the first lateral surface of the inner layer portion and a second side gap portion adjacent to the second lateral surface of the inner layer portion, and external electrodes respectively on the first end surface and the second end surface, in which a dimension of the inner layer portion in the width direction is equal or substantially equal between a side on the first main surface and a side on the second main surface in the lamination direction, and in a cross section of the lamination direction and the width direction in a middle portion in the length direction, a dimension of the first side gap portion in the width direction is equal or substantially equal between a side on the first main surface and a side on the second main surface in the lamination direction, and a dimension of the second side gap portion in the width direction increases from the middle portion in the lamination direction toward the side of the second main surface.

According to example embodiments of the present invention, it is possible to provide multilayer ceramic electronic components that are each able to satisfy a demand for a reduction in size and an increased capacitance and to reduce the possibility of occurring interlayer peeling.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
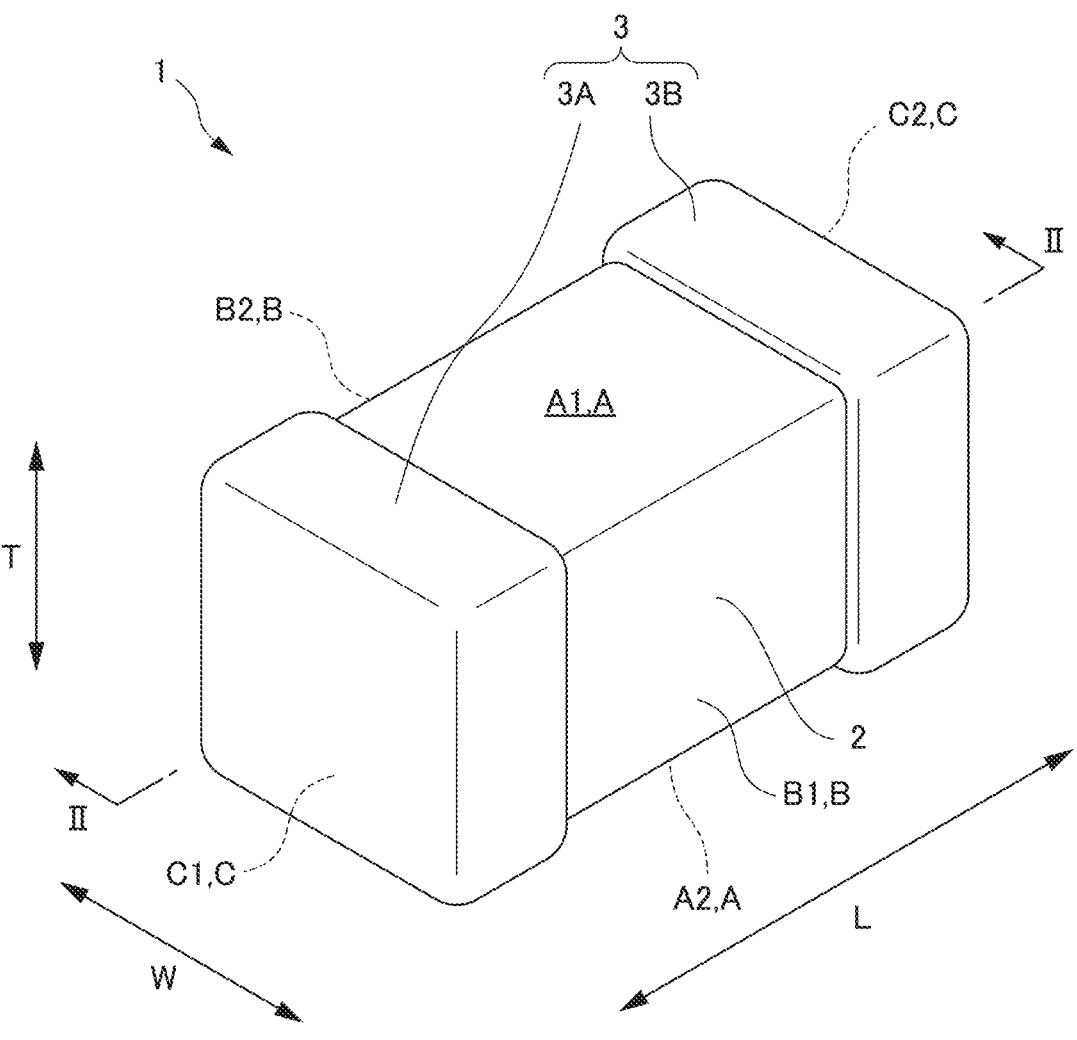
FIG. 1 is a schematic perspective view of a multilayer ceramic capacitor 1 according to an example embodiment of the present invention.
Figure 2:
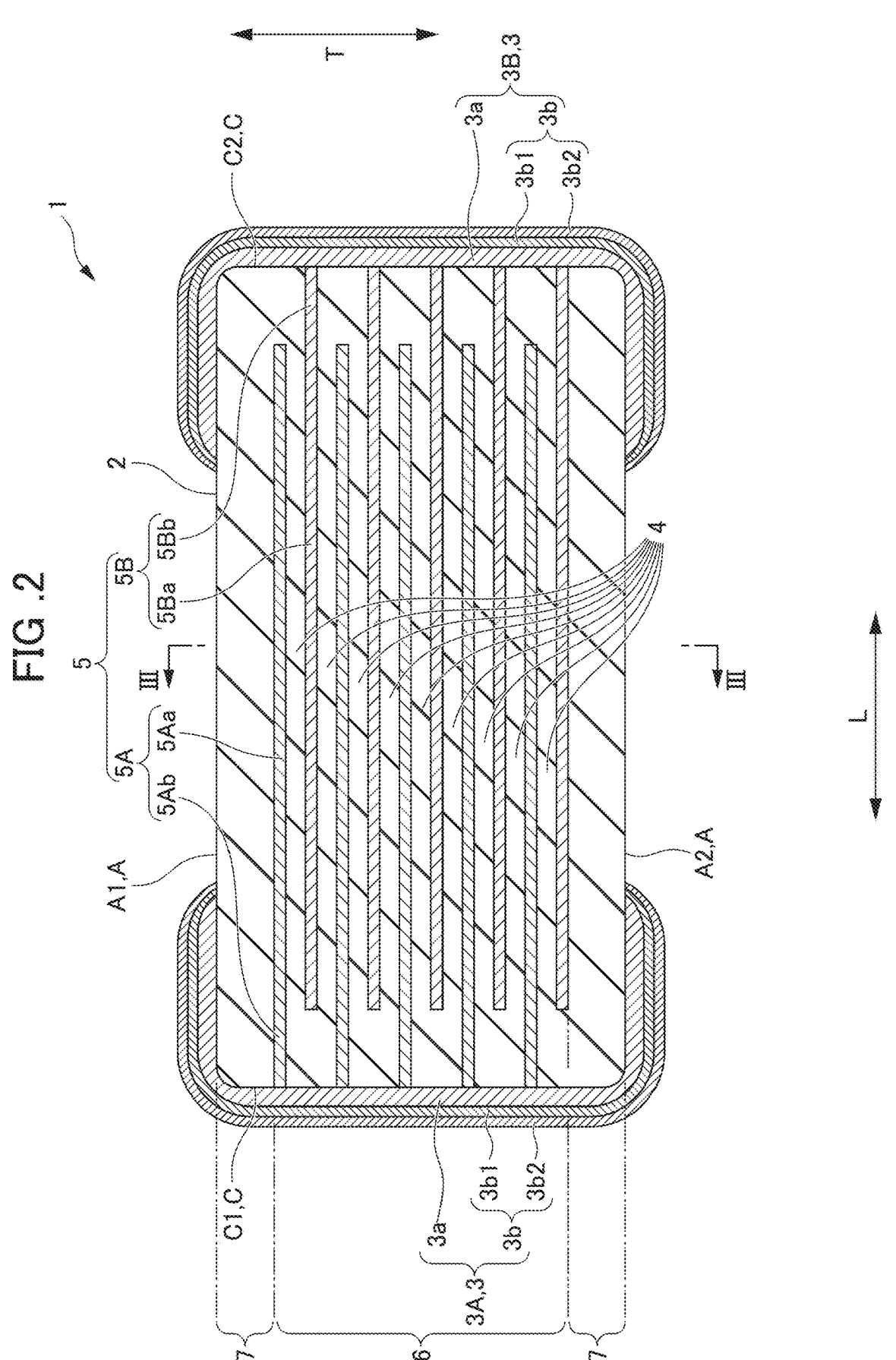
FIG. 2 is a cross-sectional view of the multilayer ceramic capacitor 1 taken along the line II-II of FIG. 1.
Figure 3:
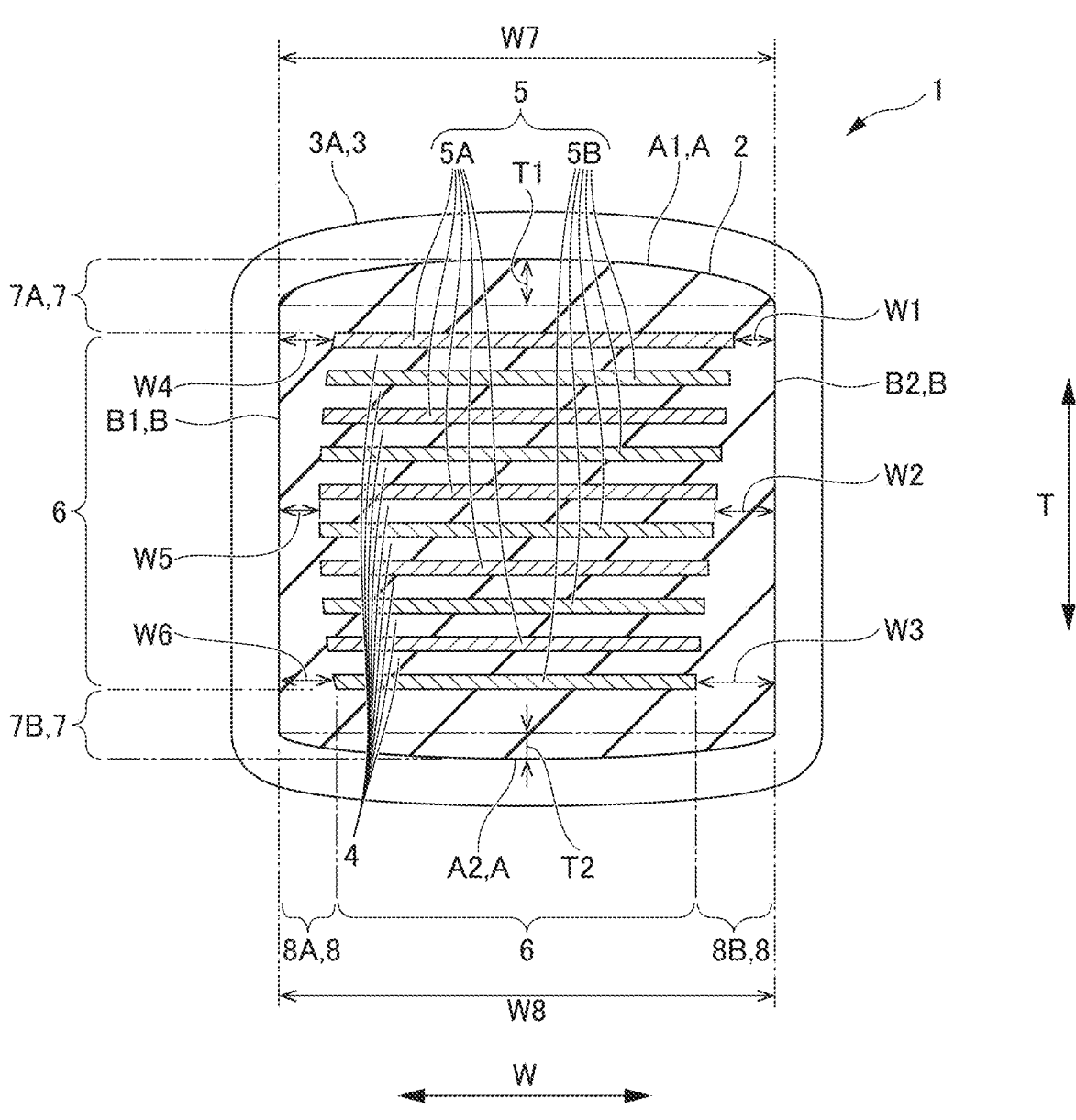
FIG. 3 is a cross-sectional view of the multilayer ceramic capacitor 1 taken along the line III-III of FIG. 2.

Hereinafter, a multilayer ceramic capacitor 1 according to an example embodiment of the present invention will be described. The multilayer ceramic capacitor 1 defines and functions as a multilayer ceramic electronic component. FIG. 1 is a schematic perspective view of a multilayer ceramic capacitor 1 according to an example embodiment of the present invention. FIG. 2 is a cross-sectional view of the multilayer ceramic capacitor 1 taken along the line II-II of FIG. 1. FIG. 3 is a cross-sectional view of the multilayer ceramic capacitor 1 taken along the line III-III of FIG. 2.

Multilayer Ceramic Capacitor 1

The multilayer ceramic capacitor 1 has a rectangular or substantially rectangular parallelepiped shape, and includes a multilayer body 2 and a pair of external electrodes 3 each on a respective one of two ends of the multilayer body 2. The multilayer body 2 includes an inner layer portion 6 including a plurality of internal dielectric layers 4 and a plurality of internal electrode layers 5 that are laminated.

In the following description, the terms indicating the orientation of the multilayer ceramic capacitor 1 are as follows. A direction in which the pair of external electrodes 3 is provided in the multilayer ceramic capacitor 1 is referred to as a length direction L. A direction in which the internal dielectric layer 4 and the internal electrode layer 5 are laminated is referred to as a lamination (stacking) direction T. A direction intersecting both the length direction L and the lamination direction T is referred to as a width direction W. In the example embodiments, the width direction W is orthogonal or substantially orthogonal to both the length direction L and the lamination direction T.

When the dimension in the length direction L is defined as an L dimension, the L dimension of the multilayer ceramic capacitor 1 is preferably, for example, about 0.2 mm or more and about 10 mm or less. When the dimension in the lamination direction T is defined as a T dimension, the T dimension of the multilayer ceramic capacitor 1 is preferably, for example, about 0.1 mm or more and about 10 mm or less. Further, when the dimension in the width direction W is defined as a W dimension, the dimension W of the multilayer ceramic capacitor 1 is preferably, for example, about 0.1 mm or more and about 10 mm or less. The L dimension of the multilayer ceramic capacitor 1 is not necessarily longer than the W dimension.

In the following description, among the six outer peripheral surfaces of the multilayer body 2, a pair of outer peripheral surfaces opposed to each other in the lamination direction T are referred to as a first main surface A1 and a second main surface A2, a pair of outer peripheral surfaces opposed to each other in the width direction W are referred to as a first lateral surface B1 and a second lateral surface B2, and a pair of outer surfaces opposed to each other in the length direction L are referred to as a first end surface C1 and a second end surface C2. In addition, the first main surface A1 and the second main surface A2 are collectively referred to as a main surface A when they are not necessary to be particularly distinguished from each other, the first lateral surface B1 and the second lateral surface B2 are collectively referred to as a lateral surface B when they are not necessary to be particularly distinguished from each other, and the first end surface C1 and the second end surface C2 are collectively referred to as an end surface C when they are not necessary to be particularly distinguished from each other.

Multilayer Body 2

The multilayer body 2 includes an inner layer portion 6 and outer layer portions 7 each provided on a respective one of two main surfaces A of the inner layer portion 6. As shown in FIG. 1, the multilayer body 2 has a rectangular or substantially rectangular parallelepiped shape. The dimension of the multilayer body 2 is not particularly limited, but the dimension L is preferably, for example, about 0.2 mm or more and about 10 mm or less. The T dimension of the multilayer body 2 is preferably, for example, about 0.1 mm or more and about 10 mm or less. The W dimension of the multilayer body 2 is preferably, for example, about 0.1 mm or more and about 10 mm or less. The L dimension of the multilayer body 2 is not necessarily longer than the W dimension.

The corner portions and ridge portions of the multilayer body 2 are preferably rounded. The corner portion is a portion where the three surfaces of the multilayer body 2 intersect, and the ridge portion is a portion where the two surfaces of the multilayer body 2 intersect. In addition, for example, unevenness or the like may be provided on a portion or the whole of the surface of the multilayer body 2.

Further, the first main surface A1 of the multilayer body 2 is curved in the cross section shown in FIG. 3, and the middle portion in the width direction W has a convex shape protruding upward in the drawing from both sides in the width direction W. The second main surface A2 is also curved in the cross section shown in FIG. 3, and the middle portion in the width direction W protrudes downward in the drawing from both sides in the width direction W. The protruding amount T1 of the first main surface A1 is larger than the protruding amount T2 of the second main surface A2.

The protrusion amount T1 of the first main surface A1 is a distance T1 in the lamination direction T between an upper end adjacent to the first main surface A1 of a portion indicated by a straight or substantially straight line in FIG. 3 in each of the outlines of the first lateral surface B1 and the second lateral surface B2, and a top portion of the convex shape protruding to the upper side of the first main surface A1. The protrusion amount T2 of the second main surface A2 is a distance T2 in the lamination direction T between a lower end adjacent to the second main surface A2 of a portion indicated by a straight or substantially straight line in FIG. 3 in each of the outlines of the first lateral surface B1 and the second lateral surface B2, and a top portion of the convex shape protruding to the lower side of the second main surface A2.

Inner Layer Portion 6

The inner layer portion 6 includes the plurality of internal dielectric layers 4 and the internal electrode layers 5 that are laminated.

Internal Dielectric Layer 4

The internal dielectric layers 4 are each made of a dielectric material. The dielectric material may be, for example, a dielectric ceramic including components such as $BaTiO_3$, $CaTiO_3$, $SrTiO_3$, or $CaZro_3$. Further, the dielectric material may be a material obtained by adding subcomponents such as, for example, a Mn compound, a Fe compound, a Cr compound, a Co compound, and a Ni compound to these main components. The dielectric material is particularly preferably, for example, a material including $BaTiO_3$ as a main component.

The thickness of each of the internal dielectric layers 4 is preferably, for example, about 0.5 μm or more and about 15 μm or less. The number of the internal dielectric layers 4 to be laminated is preferably, for example, 10 or more and 700 or less. The number of the internal dielectric layers 4 is a total number of the number of the dielectric layers of the inner layer portion 11 and the number of the dielectric layers of the first outer layer portion 7A and the second outer layer portion 7B.

Internal Electrode Layer 5

The internal electrode layers 5 include a plurality of first internal electrode layers 5A and a plurality of second internal electrode layers 5B. The first internal electrode layers 5A and the second internal electrode layers 5B are alternately provided. In addition, the first internal electrode layers 5A and the second internal electrode layers 5B are collectively described as the internal electrode layer 5 when they are not necessary to be particularly distinguished from each other.

The thickness of each of the first internal electrode layers 5A and the second internal electrode layers 5B is preferably, for example, about 0.2 μm or more and about 2.0 μm or less. The total number of the first internal electrode layers 5A and the second internal electrode layers 5B is preferably, for example, 10 or more and 700 or less.

The first internal electrode layers 5A and the second internal electrode layers 5B are each made of an appropriate electrically conductive material such as, for example, a metal such as Ni, Cu, Ag, Pd, or Au, or an alloy including at least one of these metals. When an alloy is used, the first internal electrode layers 5A and the second internal electrode layers 5B may be made of, for example, an Ag—Pd alloy.

Each of the first internal electrode layer 5A includes a first counter portion 5Aa opposed to the second internal electrode layer 5B, and a first extension portion 5Ab extending from the first counter portion 5Aa toward the first end surface C1. The first extension portion 5Ab includes an end portion which is exposed at the first end surface C1 and is electrically connected to a first external electrode 3A described later. The second internal electrode layer 5B includes a second opposing portion 5Ba opposed to the first internal electrode layer 5A, and a second extension portion 5Bb extending from the second opposing portion 5Ba toward the second end surface C2. The second extension portion 5Bb includes an end portion which is electrically connected to a second external electrode 3B described later.

Electric charges are accumulated in the first counter portions 5Aa of the first internal electrode layers 5A and the second counter portions 5Ba of the second internal electrode layers 5B, thus defining and functioning as a capacitor.

The shapes of the first counter portion 5Aa and the second counter portion 5Ba are not particularly limited, but are preferably rectangular or substantially rectangular. However, the corner portions of the rectangular shape may be rounded, or the corner portions of the rectangular shape may be provided obliquely. The shapes of the first extension portion 5Ab and the second extension portion 5Bb are not particularly limited, but are preferably rectangular or substantially rectangular. However, the corner portions of the rectangular shape may be rounded, or the corner portions of the rectangular shape may be provided obliquely.

Outer Layer Portion 7

Each of the outer layer portions 7 may be made of the same dielectric ceramic material as that of the internal dielectric layers 4 of the inner layer portion 6.

Side Gap Portion 8

The multilayer body 2 includes a first side gap portion 8A provided adjacent to the first lateral surface B1 in the inner layer portion 6 and a second side gap portion 8B provided adjacent to the second lateral surface B2 in the inner layer portion 6. In addition, the first side gap portion 8A and the second side gap portion 8B are collectively described as the side gap portion 8 when it is not necessary to distinguish them from each other.

In the cross section shown in FIG. 3, in the first side gap portion 8A, the dimension W4 in the width direction W adjacent to the first main surface A1 in the lamination direction T is equal or substantially equal to the dimension W6 in the width direction W adjacent to the second main surface A2 in the lamination direction T. The dimension W5 in the width direction W of the middle portion in the lamination direction T is the smallest. That is, the dimension W5 in the width direction W of the middle portion in the lamination direction T is smaller than the dimension W4 in the width direction W adjacent to the first main surface A1 in the lamination direction T and the dimension W6 in the width direction W adjacent to the second main surface A2 in the lamination direction T. However, the variation of the first side gap portion 8A in the width direction W is, for example, within about 5%, the difference in the dimensions of the first side gap portion 8A in the width direction W is smaller than the difference in the dimension of the second side gap portion 8B in the width direction W as described below, and can be considered to be constant or substantially constant.

On the other hand, the dimension of the second side gap portion 8B in the width direction W gradually increases from the middle portion in the lamination direction T toward the second main surface A2. That is, when the dimension in the width direction W of the middle portion in the lamination direction T is defined as W2 and the dimension in the width direction W of the end portion adjacent to the second main surface A2 in the lamination direction T is defined as W3, their relationship is expressed as W2<W3, and furthermore, the dimension gradually increases from W2 to W3, i.e., gradually increases from the middle portion in the lamination direction T, which is the dimension W2 in the width direction W, toward the end portion adjacent to the second main surface A2 in the lamination direction T, which is the dimension W3 in the width direction W.

Further, in the present example embodiment, when the dimension of the second side gap portion 8B in the width direction W of the end portion adjacent to the first main surface A1 in the lamination direction T is defined as W1, their relationship is expressed as W1<W2<W3, and furthermore, the dimension gradually increases from the end portion adjacent to the first main surface A1 in the lamination direction T toward the second main surface A2 in the lamination direction T from W1 to W3 through W2.

The maximum dimension of the second side gap portion 8B in the width direction W is, for example, about 1.5 times or more the minimum dimension of the second side gap portion 8B in the width direction W, for example. In the example embodiment, the maximum dimension of the second side gap portion 8B in the width direction W is W3, and the minimum dimension of the second side gap portion 8B in the width direction W is W1, and the relationship is expressed as, for example, about 1.5 W1<W3.

Here, the dimension in the width direction W from the outer surface of the first side gap portion 8A to the outer surface of the second side gap portion 8B, that is, the dimension in the width direction W of the inner layer portion 6 may be equal or substantially equal to each other between the first main surface A1 side and the second main surface A2 side in the lamination direction T. That is, the dimension W7 of the inner layer portion 6 in the width direction W adjacent to the first main surface A1 may be equal or substantially equal to the dimension W8 of the inner layer portion 6 in the width direction W adjacent to the second main surface A2. Here, if the difference between the dimensions W7 and W8 described above falls within about 5%, it can be considered that they are substantially equal. The variation in the dimensions of the inner layer portion 6 in the width direction W along the lamination direction may be, for example, about 5% or less. When the variation in the dimensions of the inner layer portion 6 in the width direction W along the lamination direction falls within about 5%, the dimension can be considered to be substantially constant along the lamination direction.

In addition, the dimensions W1 to W8 in the width direction W and the dimensions T1 and T2 in the lamination direction T can be measured by using a digital microscope in which a cross section as shown in FIG. 3 is exposed by polishing, and then the exposed cross section is measured.

External Electrode 3

The external electrodes 3 includes a first external electrode 3A on the first end surface C1 of the multilayer body 2 and a second external electrode 3B on the second end surface C2 of the multilayer body 2. In addition, the first external electrode 3A and the second external electrode 3B are collectively described as the external electrode 3 when it is not necessary to particularly distinguish them from each other. Each of the external electrodes 3 covers not only the end surface C but also a portion of the main surface A and a portion of the lateral surface B which are adjacent to the end surface C.

Each of the external electrodes 3 includes a base electrode layer 3a and a plated layer 3b provided outside the base electrode layer 3a.

Base Electrode Layer 3a

The base electrode layer 3a is electrically connected to each end of the extension portions 5Ab and the extension portions 5Bb of the internal electrode layers 5 exposed at the end surface C.

The base electrode layer 3a is a fired layer. The fired layer preferably includes, for example, a metal component and either or both of a glass component and a ceramic component. The metal component includes, for example, at least one of Cu, Ni, Ag, Pd, Ag—Pd alloy, and Au. The glass component includes, for example, at least one of B, Si, Ba, Mg, Al, and Li. The ceramic component may be a ceramic material of the same kind as that of the internal dielectric layers 4, or may be a ceramic material of a different kind. The ceramic component includes, for example, at least one of $BaTiO_3$, $CaTiO_3$, (Ba, Ca) $TiO_3$, $SrTiO_3$, and $CaZrO_3$. The main component metal of the base electrode layer 3a is preferably Cu, for example.

The fired layer is formed, for example, by applying an electrically conductive paste including glass and metal to the multilayer body 2 and being fired. The fired layer can be formed by simultaneously firing a multilayer chip before firing, which is a material of the multilayer body 2 including a plurality of internal electrodes a plurality of dielectric layers, and an electrically conductive paste applied to the multilayer chip. Alternatively, the multilayer chip may be fired to obtain the multilayer body 2, and then an electrically conductive paste may be applied to the multilayer body 2 and fired. In a case of using the above formation method, it is preferable that the fired layer is formed by firing a ceramic material added instead of the glass component. In this case, as the ceramic material to be added, it is particularly preferable to use the same kind of ceramic material as that of the internal dielectric layers 4. The fired layer may include a plurality of layers.

The thickness of the base electrode layer 3a on the end surface C in the length direction L is preferably, for example, about 2 μm or more and about 220 μm or less in the middle of the base electrode layer 3a in the lamination direction T and the width direction W.

The thickness of the base electrode layer 3a on the main surface A (the thickness in the normal direction with respect to the main surface A) is preferably, for example, about 4 μm or more and about 40 μm or less in the middle portion of the base electrode layer 3a on the main surface A in the length direction L and the width direction W.

The thickness of the base electrode layer 3a on the lateral surface B (the thickness in the normal direction with respect to the lateral surface B) is preferably, for example, about 4 μm or more and about 40 μm or less in the middle portion of the base electrode layer 3a on the lateral surface B in the length direction L and the lamination direction T.

Electrically Conductive Resin Layer

An electrically conductive resin layer may be provided over the base electrode layer. The electrically conductive resin layer includes, for example, a resin component and a metal component. The electrically conductive resin layer includes, for example, a thermosetting resin. By including the thermosetting resin, the electrically conductive resin layer is more flexible than the base electrode layer. The end of the electrically conductive resin layer is preferably in contact with the multilayer body 2. The electrically conductive resin layer defines and functions as a buffer layer. Therefore, when bending stress is applied to the mounting board and physical impact is applied to the multilayer ceramic capacitor 1 by this stress, cracks are less likely to occur in the multilayer ceramic capacitor 1. When shock caused by a thermal cycle is applied to the multilayer ceramic capacitor 1, cracks hardly occur in the multilayer ceramic capacitor 1.

The thermosetting resin included in the electrically conductive resin layer may be a thermosetting resin such as, for example, an epoxy resin, a phenol resin, a urethane resin, a silicone resin, or a polyimide resin. Among these resins, for example, epoxy resin is one of the most suitable resins. Epoxy resins are excellent in heat resistance, moisture resistance, adhesiveness, and the like.

The electrically conductive resin layer preferably includes a curing agent in addition to the thermosetting resin. When an epoxy resin is used as the thermosetting resin, the curing agent may be, for example, a phenolic compound, an amine-based compound, an acid anhydride-based compound, an imidazole-based compound, an active ester-based compound, an amideimide-based compound, or the like.

As described above, the electrically conductive resin layer includes a metal component. When the metal component is included in the electrically conductive resin layer, the electrically conductive resin layer can be energized. The metal component included in the electrically conductive resin layer is included in the electrically conductive resin layer as a metal filler. The thickness of the electrically conductive resin layer is preferably, for example, about 10 μm or more and about 150 μm or less.

The base electrode layer 3a may be omitted. The base electrode layer may be a thin film layer. In a case where the base electrode layer is a thin film layer, the thin film layer can be formed by a thin film formation method such as, for example, a sputtering method or an evaporation method. The formed thin film layer becomes a layer on which metal particles are deposited. The thickness of the thin film layer is preferably, for example, about 1 μm or less.

Plated Layer 3b

The plated layer 3b includes, for example, a Ni plated layer 3b1 and a Sn plated layer 3b2.

Ni Plated Layer 3b1

The Ni plated layer 3b1 is provided on the base electrode layer. The Ni plated layer 3b1 covers at least a portion of the base electrode layer. The Ni plated layer 3b1 reduces or prevents the base electrode layer and the like from being eroded by solder when the multilayer ceramic capacitor 1 is mounted.

Sn Plated Layer 3b2

The Sn plated layer 3b2 is provided on the Ni plated layer 3b1. The Sn plated layer 3b2 covers at least a portion of the Ni plated layer 3b1.

The Sn plated layer 3b2 has good solder wettability. The Sn plated layer 3b2 facilitates mounting of the multilayer ceramic capacitor 1 on a board or the like. The thickness per one layer of the Ni plated layer 3b1 and the Sn plated layer 3b2 is preferably, for example, about 1 μm or more and about 15 μm or less.

Method of Manufacturing Multilayer Ceramic Capacitor 1

Figure 4:
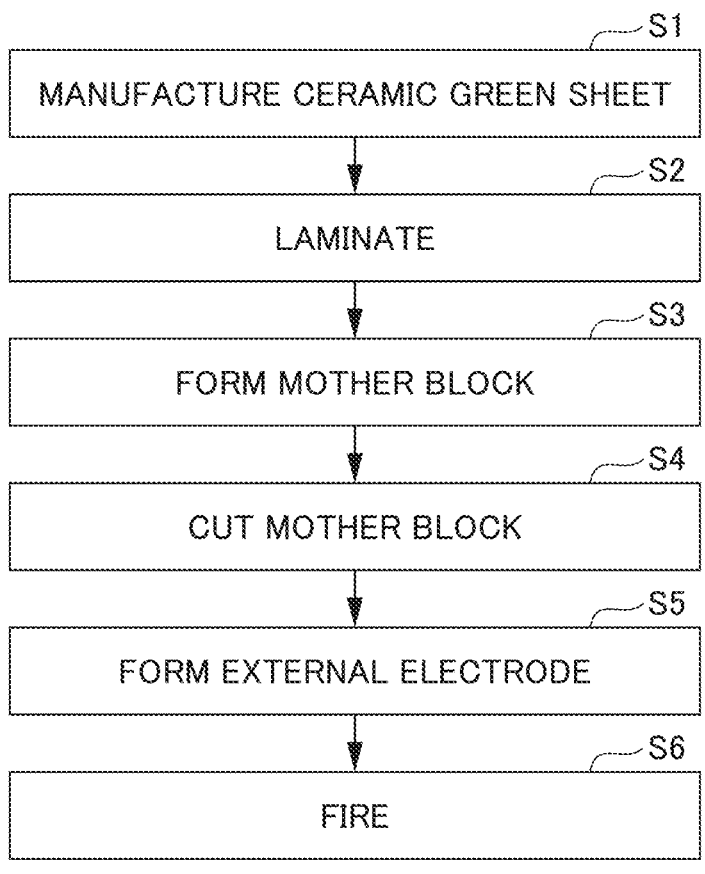
FIG. 4 is a flowchart of a method of manufacturing the multilayer ceramic capacitor 1 according to an example embodiment of the present invention.
Figure 5A:
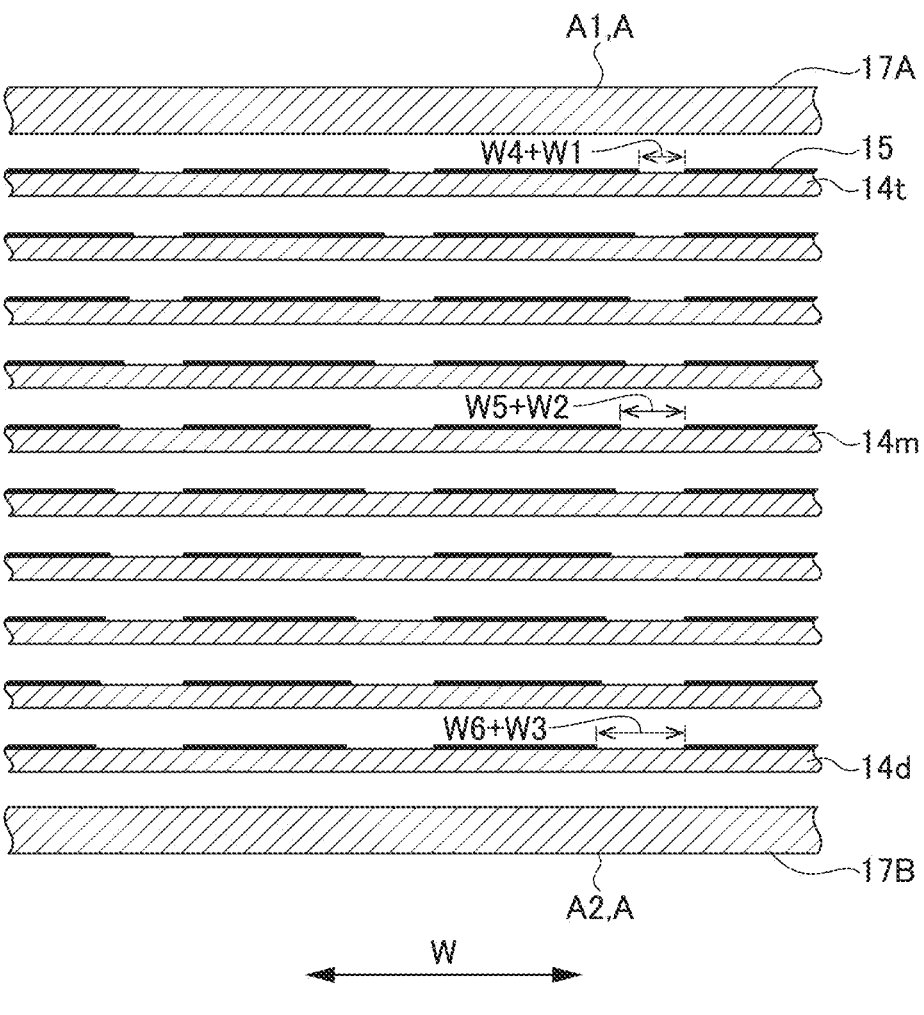
FIG. 5A is a diagram of a method of manufacturing the multilayer ceramic capacitor 1 according to an example embodiment of the present invention.
Figure 5B:
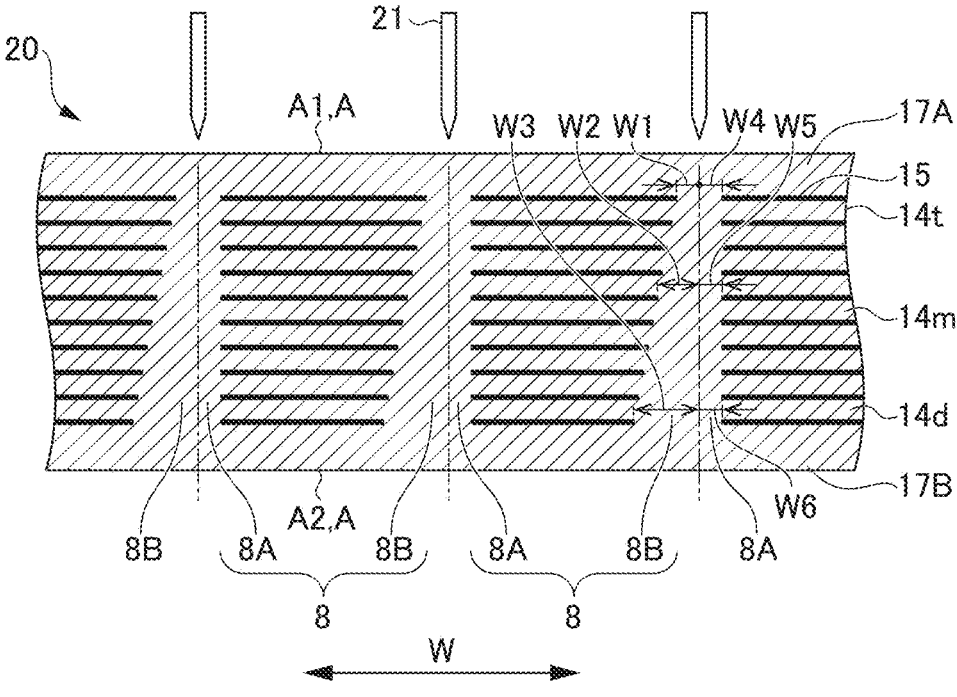
FIG. 5B is a diagram of a method of manufacturing the multilayer ceramic capacitor 1 according to an example embodiment of the present invention.

Next, an example of a method of manufacturing the multilayer ceramic capacitor 1 will be described. The method of manufacturing the multilayer ceramic capacitor 1 of the example embodiment is not limited as long as the above-described requirements are satisfied. However, a preferred manufacturing method includes the following steps. FIG. 4 is a flowchart of a method of manufacturing the multilayer ceramic capacitor 1. FIG. 5A is a view of a plurality of ceramic green sheets 14 before lamination in the manufacturing method of the multilayer ceramic capacitor 1. FIG. 5B is a cross-sectional view of the mother block 20 in which the plurality of ceramic green sheets 14 are laminated.

Ceramic Green Sheet Manufacturing Step S1

First, a ceramic slurry including a ceramic powder, a binder, and a solvent is applied to a carrier film in the form of a sheet to manufacture the ceramic green sheets 14.

Subsequently, an electrically conductive paste 15 including a metal powder, a binder, an additive such as, for example, a plasticizer or a dispersant, an organic solvent, or the like is printed on the ceramic green sheet 14 by, for example, screen printing, ink jet printing, gravure printing or the like so as to have a belt pattern.

As described above, the dimension of the second side gap portion 8B of the multilayer ceramic capacitor 1 of the present example embodiment to be manufactured gradually increases from the dimension W1 in the width direction W of the end portion adjacent to the first main surface A1 in the lamination direction T toward the second main surface A2 in the lamination direction T from W1 to W3 through W2, as shown in FIG. 3. The maximum dimension W3 of the second side gap portion 8B in the width direction W is, for example, about 1.5 times or more (about 1.5 W1<W3) the minimum dimension W1 of the second side gap portion 8B in the width direction W, for example.

Further, in the first side gap portion 8A of the multilayer ceramic capacitor 1, as shown in FIG. 3, the dimension in the width direction W of the end portion adjacent to the first main surface A1 in the lamination direction T is defined as W4. The dimension in the width direction W of the end portion adjacent to the second main surface A2 in the lamination direction T is defined as W6. The dimension W6 is equal or substantially equal to W4. The dimension W5 in the width direction W of the middle portion in the lamination direction T is smaller than the dimensions W4 and W6. However, the variation in the dimension in the width direction W of the end portion of the first side gap portion 8A of the multilayer ceramic capacitor 1 adjacent to the first main surface A1 in the lamination direction T falls within, for example, about 5%. Therefore, as compared to the variation in the width direction W of the second side gap portion 8B, the variation in the dimension in the width direction W of the end portion of the first side gap portion 8A is small. In addition, W4 may be equal or substantially equal to W1.

In order to manufacture such a multilayer ceramic capacitor 1, the electrically conductive paste 15 printed on the surface of the ceramic green sheet 14 is printed so that the dimension in the width direction W gradually decreases from the ceramic green sheet 14t adjacent to the first main surface A1 to the ceramic green sheet 14d adjacent to the second main surface A2. FIG. 5A shows a plurality of ceramic green sheets 14 printed such that the width of the electrically conductive paste 15 in the width direction W gradually decreases from the first main surface A1 side toward the second main surface A2 side.

The ceramic green sheet 14t located closest to the first main surface A1 in the inner layer portion 6 has the largest dimension in the width direction of the electrically conductive paste 15, i.e., substantially W1+W4 having the smallest gap between the electrically conductive pastes 15 adjacent to each other in the width direction W (the interval of W1+W4 after firing).

In the ceramic green sheet 14*m* positioned substantially in the middle portion of the first main surface A1 and the second main surface A2, the gap between the electrically conductive pastes 15 adjacent to each other in the width direction W is substantially W2+W5 (the interval of W2+W5 after firing).

The ceramic green sheet 14*d* located closest to the second main surface A2 in the inner layer portion 6 has the smallest dimension in the width direction of the electrically conductive paste 15, i.e., substantially W3+W6 having the largest gap between the electrically conductive pastes 15 adjacent to each other in the width direction W (the interval of W3+W6 after firing).

Lamination Step S2

The ceramic green sheets 14 on each of which the electrically conductive paste 15 is printed are laminated such that each of the electrically conductive pastes 15 is shifted by half pitch in the length direction L between the ceramic green sheets 14 adjacent to each other in the lamination direction T.

On the other hand, in the width direction W, the ceramic green sheets 14 on each of which the electrically conductive paste 15 is printed are laminated such that one end (the left end of each conductive paste 15 in FIG. 5B) of each of the electrically conductive pastes 15 in the width direction W is located at or substantially at the same position in the width direction W between the ceramic green sheets 14 adjacent to each other in the lamination direction T, as shown in FIG. 5B. Then, the other end of each of the electrically conductive pastes 15 in the width direction W (the right end of each conductive paste 15 in FIG. 5B) is slightly shifted to the left side in the width direction W from the top to the bottom in the drawing, and a line between the right ends becomes an oblique straight line.

Mother Block Formation Step S3

The ceramic green sheet 17A for the outer layer portion defining and functioning as the first outer layer portion 7A and the ceramic green sheet 17B for the outer layer portion defining and functioning as the second outer layer portion 7B are laminated respectively on one of both sides of the laminated ceramic green sheets 14 in the lamination direction T, and they are thermally bonded to form the mother block 20 shown in FIG. 5B.

At this time, the multilayer ceramic capacitor 1 is pressed in the lamination direction T, and the middle portion of the inner layer portion 6 in the middle portion in the lamination direction T extends slightly in the width direction, such that the dimension in the width direction W of the middle portion in the lamination direction T of the first side gap portion 8A becomes the dimension of W5, which is slightly smaller than the dimensions of W4 and W6. However, since the variation in the dimension in the width direction W of the end portion of the first side gap portion 8A in the lamination direction T of the multilayer ceramic capacitor 1 adjacent to the first main surface A1 falls within about 5%, it can be considered to be substantially uniform as compared to the variation in the dimension in the width direction W of the second side gap portion 8B.

Mother Block Cutting Step S4

Next, the mother block 20 is cut by the cutting blade 21 to have a fixed size at regular intervals in the width direction W and the length direction L. FIG. 5B is a diagram of a state in which the mother block 20 is cut in the width direction W. The mother block 20 is cut between the adjacent electrically conductive pastes 15 in the width direction W by moving the cutting blade 21 from the first main surface A1 toward the second main surface A2.

At this time, in the ceramic green sheet 14*t* positioned closest to the first main surface A1, the cutting blade 21 is positioned substantially in the middle between the adjacent electrically conductive pastes 15, which is substantially W1+W4 (W1≅W4). However, as the cutting blade 21 moves from the top to the bottom, the position of the cutting blade 21 may deviate from the middle. This deviation often occurs in a certain direction.

Here, unlike the present example embodiment, when the intervals (i.e., the widths of the side gap portions) between the adjacent electrically conductive pastes 15 in all of the ceramic green sheets 14 are equal or substantially equal, there is a possibility that the cutting blade 21 deviates from the middle between the electrically conductive pastes 15 while moving from the upper side to the lower side and approaches one of the electrically conductive pastes 15.

The adhesion strength between the electrically conductive paste 15 and the ceramic green sheet 14 is weaker than that of the portion where the ceramic green sheets 14 are directly laminated. Therefore, when a force is applied from above to below to the electrically conductive paste 15 by the movement of the cutting blade 21 from above to below, there is a possibility that the ceramic green sheet 14 on which the electrically conductive paste 15 is printed is separated from the ceramic green sheet 14 laminated thereon such that interlayer peeling occurs. Since interlayer peeling occurs at this point, the finally manufactured multilayer ceramic capacitor 1 also has interlayer peeling.

However, in the present example embodiment, the ceramic green sheets 14 on each of which the electrically conductive paste 15 is printed are laminated such that the left ends of the electrically conductive pastes 15 in the width direction W are at the same or substantially the same position in the width direction W between the ceramic green sheets 14 adjacent to each other in the lamination direction T, while the right ends of the electrically conductive pastes 15 in the width direction W are slightly shifted to the left side in the width direction W in the drawing from the top toward the bottom, and the distance between the adjacent conductive pastes 15 gradually increases from the top toward the bottom, such that a line between the ends of the electrically conductive pastes 15 in the width direction W becomes oblique.

Therefore, in the mother block cutting step S4, the direction of the mother block 20 is set such that the direction in which the line between the ends of the electrically conductive pastes 15 in the width direction W becomes oblique matches the direction in which the cutting blade 21 may be displaced. In this case, even when the cutting blade 21 deviates from the middle between the electrically conductive pastes 15 from the upper side toward the lower side, the possibility that the cutting blade 21 approaches the electrically conductive paste 15 is reduced, such that peeling is less likely to occur. Therefore, the possibility that the finally manufactured multilayer ceramic capacitor 1 has interlayer peeling is reduced or prevented.

In order to avoid interlayer peeling, it is conceivable to widen the gap between the electrically conductive pastes 15 adjacent to each other in the width direction W in the left-right direction in the drawing and to further widen at the lower side than the upper side in the cutting direction so that the cutting blade 21 can move obliquely in either direction from the middle portion between the electrically conductive pastes 15.

However, in recent years, there has been a demand for a reduction in size and an increased capacitance of a multilayer ceramic capacitor. In this case, when the width of the side gap portion increases toward the lower side on both the left and right sides in the width direction W, the widths of the electrically conductive pastes 15 (the internal electrode layers) on the lower side become considerably narrow, resulting in a decrease in capacitance.

In the multilayer ceramic capacitor 1 of the present example embodiment, the width of one side gap portion in the width direction W is constant or substantially constant. Therefore, the widths of the electrically conductive pastes 15 (the internal electrode layers) on the lower side can be increased as compared to the case where the width of the side gap portion increases toward the lower side on both sides in the width direction W.

That is, the multilayer ceramic capacitor 1 of the present example embodiment can reduce or prevent interlayer peeling while minimizing a decrease in capacitance.

External Electrode Formation Step S5

The external electrodes 3 are formed at both ends of each of the multilayer bodies 2 manufactured by cutting the mother block 20 in this manner.

Firing Step S6

Then, the multilayer ceramic capacitor 1 shown in FIG. 1 is manufactured by heating at a set firing temperature in a nitrogen atmosphere for a predetermined time and firing the external electrodes 3 on the multilayer body 2.

As described above, according to the example embodiments of the present invention, it is possible to provide multilayer ceramic capacitors that are each able to reduce the possibility of the occurrence of interlayer peeling while maintaining the capacitance.

Figure 6A:
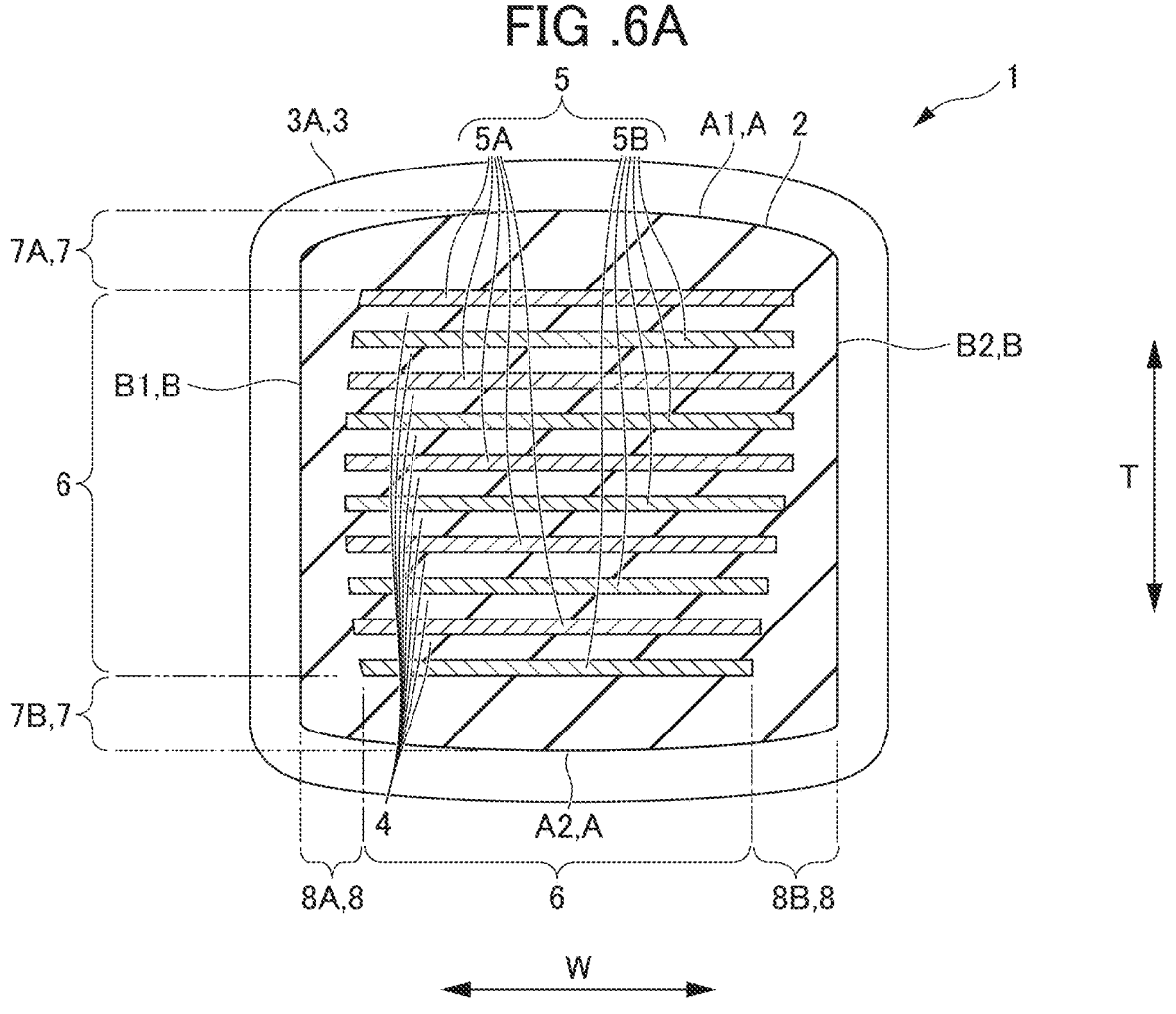
FIG. 6A is a view of a multilayer ceramic capacitor 1 according to a modified example of an example embodiment of the present invention.
Figure 6B:
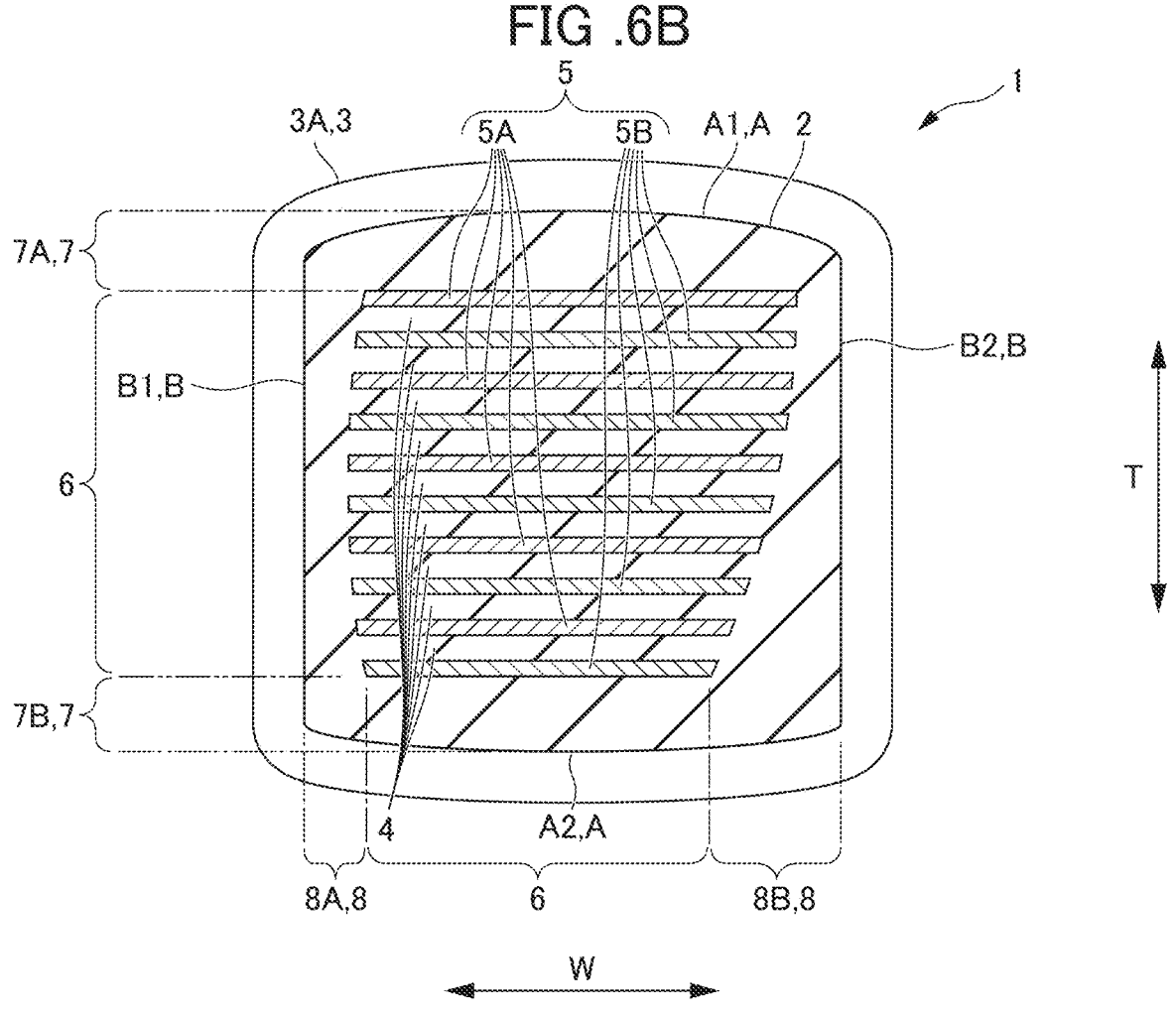
FIG. 6B is a view of a multilayer ceramic capacitor 1 according to a modified example of an example embodiment of the present invention.

Although example embodiments of the present invention have been described above, the present invention is not limited to the example embodiments described above, and various changes and modifications thereto as follows are possible. FIGS. 6A and 6B are diagrams each showing a multilayer ceramic capacitor 1 according to a modified example of an example embodiment of the present invention.

In the above-described example embodiments, in the second side gap portion 8B, the dimension in the width direction W of the end portion adjacent to the first main surface A1 in the lamination direction T is the dimension W1 (W1<W2<W3), and the dimension from W1 to W3 gradually increases from the end portion adjacent to the first main surface A1 in the lamination direction T toward the second main surface A2 in the lamination direction T. However, the present invention is not limited thereto, and as long as the dimension of the second side gap portion 8B in the width direction W gradually increases from the middle portion toward the second main surface A2 in the lamination direction T, the dimension may be the same or substantially the same dimension, which is the dimension W2, from the end portion adjacent to the first main surface A1 to the middle portion in the lamination direction T as shown in FIG. 6A.

Further, in the above-described example embodiments, in the other end portions of the electrically conductive pastes 15 in the width direction W are slightly shifted in the width direction W from the top toward the bottom, and the line between the end portions on both sides in the lamination direction becomes an oblique straight line. However, the present invention is not limited thereto, and the straight line between the end portions of the internal electrode layers may be curved as shown in FIG. 6B, as long as the dimension of the second side gap portion 8B in the width direction W gradually increases from the middle portion in the lamination direction T toward the second main surface A2.

Further, the various modifications and variations thereto are possible.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including an inner layer portion including a plurality of internal electrode layers and a plurality of internal dielectric layers that are laminated, a first main surface and a second main surface opposed to each other in a lamination direction, a first end surface and a second end surface opposed to each other in a length direction intersecting the lamination direction, a first lateral surface and a second lateral surface opposed to each other in a width direction intersecting the lamination direction and the length direction, two outer layer portions respectively on one of two sides of the inner layer portion in the lamination direction, and a first side gap portion adjacent to the first lateral surface of the inner layer portion and a second side gap portion adjacent to the second lateral surface of the inner layer portion; and
external electrodes respectively on the first end surface and the second end surface; wherein
a dimension of the inner layer portion in the width direction is equal or substantially equal between a side on the first main surface and a side on the second main surface in the lamination direction; and
in a cross section of the lamination direction and the width direction in a middle portion in the length direction, a dimension in the width direction of the first side gap portion that is closest to the first main surface in the lamination direction is equal or substantially equal to a dimension in the width direction of the first side gap portion that is closest to the second main surface in the lamination direction, and a dimension of the second side gap portion in the width direction increases from the middle portion in the lamination direction toward the side of the second main surface.

2. The multilayer ceramic electronic component according to claim 1, wherein a variation in the dimension of the first side gap portion in the width direction along the lamination direction is about 5% or less.

3. The multilayer ceramic electronic component according to claim 1, wherein the dimension of the second side gap portion in the width direction increases from the first main surface toward the second main surface.

4. The multilayer ceramic electronic component according to claim 1, wherein a maximum dimension of the second side gap portion in the width direction is about 1.5 times or more a minimum dimension of the second side gap portion in the width direction.

5. The multilayer ceramic electronic component according to claim 1, wherein a dimension of the multilayer body in the length direction is about 0.2 mm or more and about 10 mm or less;

a dimension of the multilayer body in the lamination direction is about 0.1 mm or more and about 10 mm or less; and a dimension of the multilayer body in the width direction is about 0.1 mm or more and about 10 mm or less.

6. The multilayer ceramic electronic component according to claim 1, wherein corner portions and ridge portions of the multilayer body are rounded.

7. The multilayer ceramic electronic component according to claim 1, wherein each of the plurality of internal dielectric layers includes a dielectric ceramic material.

8. The multilayer ceramic electronic component according to claim 7, wherein the dielectric ceramic material includes at least one of $BaTiO_3$, $CaTiO_3$, $SrTiO_3$, or $CaZrO_3$ as a main component.

9. The multilayer ceramic electronic component according to claim 8, wherein the dielectric ceramic material includes at least one of a Mn compound, a Fe compound, a Cr compound, a Co compound, or a Ni compound as a subcomponent.

10. The multilayer ceramic electronic component according to claim 1, wherein a thickness of each of the plurality of dielectric layers is about 0.5 μm or more and about 15 μm or less.

11. The multilayer ceramic electronic component according to claim 1, wherein a number of the plurality of dielectric layers is 10 or more and 700 or less.

12. The multilayer ceramic electronic component according to claim 1, wherein a thickness of each of the plurality of internal electrode layers is about 0.2 μm or more and about 2.0 μm or less.

13. The multilayer ceramic electronic component according to claim 1, wherein a number of the plurality of internal electrode layers is 10 or more and 700 or less.

14. The multilayer ceramic electronic component according to claim 1, wherein each of the plurality of internal electrode layers includes at least one of Ni, Cu, Ag, Pd, or Au, or an alloy including at least one of Ni, Cu, Ag, Pd, or Au.

15. The multilayer ceramic electronic component according to claim 1, wherein each of the external electrodes includes a base electrode layer and a plated layer on the base electrode layer.

16. The multilayer ceramic electronic component according to claim 15, wherein the base electrode layer is a fired layer.

17. The multilayer ceramic electronic component according to claim 16, wherein the base electrode layer includes a metal component and at least one of a glass component or a ceramic component.

18. The multilayer ceramic electronic component according to claim 17, wherein the metal component includes at least one of Cu, Ni, Ag, Pd, Ag—Pd alloy or Au.

19. The multilayer ceramic electronic component according to claim 17, wherein the glass component includes at least one of B, Si, Ba, Mg, Al, or Li.

20. The multilayer ceramic electronic component according to claim 17, wherein the ceramic component includes at least one of $BaTiO_3$, $CaTiO_3$, $(Ba, Ca) TiO_3$, $SrTiO_3$, or $CaZrO_3$.

* * * * *